United States Patent [19]

Kawamura

[11] Patent Number: 5,054,443
[45] Date of Patent: Oct. 8, 1991

[54] HEAT-INSULATING ENGINE WITH SWIRL CHAMBER

[75] Inventor: Hideo Kawamura, Samukawa, Japan

[73] Assignee: Isuzu Motors Limited, Tokyo, Japan

[21] Appl. No.: 427,207

[22] Filed: Oct. 24, 1989

[30] Foreign Application Priority Data

Oct. 28, 1988 [JP] Japan .................. 63-270923

[51] Int. Cl.$^5$ ............................................ F02B 19/02
[52] U.S. Cl. ................... 123/254; 123/270; 123/292
[58] Field of Search ............. 123/254, 255, 270, 271, 123/282, 286, 292

[56] References Cited

U.S. PATENT DOCUMENTS

| 2,014,828 | 9/1935 | Wirrer . | |
|---|---|---|---|
| 4,300,497 | 11/1981 | Webber | 123/292 X |
| 4,424,780 | 1/1984 | Trucco | 123/292 X |
| 4,429,669 | 2/1984 | Burley | 123/292 |
| 4,738,227 | 4/1988 | Kano et al. | 123/270 X |
| 4,854,281 | 8/1989 | Hareyama et al. | 123/292 |

FOREIGN PATENT DOCUMENTS

| 1401958 | 12/1968 | Fed. Rep. of Germany . | |
|---|---|---|---|
| 2530837 | 1/1977 | Fed. Rep. of Germany | 123/292 |
| 2483010 | 11/1981 | France . | |
| 21024 | 2/1984 | Japan . | |
| 212614 | 10/1985 | Japan . | |
| 123714 | 6/1986 | Japan . | |
| 2575 | of 1908 | United Kingdom | 123/292 |
| 1380941 | 1/1975 | United Kingdom | 123/292 |

OTHER PUBLICATIONS

M.T.Z., vol. 45, pp. 190–191, Fig. 1, (May 1984), "Keramische Bauteile für Verbrennungsmotoren", Droscha.

Primary Examiner—Tony M. Argenbright
Attorney, Agent, or Firm—Browdy and Neimark

[57] ABSTRACT

A heat-insulating engine with swirl chamber constructed such that a control valve of which an opening or closing can be controlled under an operation of a cam or an electromagnetic force arranged in a communication hole between a swirl chamber made of a heat-insulating wall body and a main combustion chamber, wherein the control valve is kept closed during an intake stroke, intake air is shielded against a hot temperature part of the swirl chamber, the thermal expansion caused by accepting heat of the intake air is restricted to prevent the efficiency of suction from being decreased and deterioration of the combustion speed is eliminated. Additionally, the control valve is released near the end of a compression stroke, the intake air is rapidly fed into the swirl chamber to cause rapid thermal expansion, a mixture of gas with a rich fuel ratio is ignited at a hot temperature and then combustion in a smoke generating temperature zone is cleared to prohibit generation of the smoke, whereupon a flame is blown from the swirl chamber to the main combustion chamber, the fuel ratio is rapidly decreased and the combustion temperature is also decreased, so that combustion at NOx generating temperature zones is avoided to restrict occurrence of NOx.

26 Claims, 4 Drawing Sheets

HEAT-INSULATING ENGINE WITH SWIRL CHAMBER

BACKGROUND OF THE INVENTION

1. Field of the Invention

This invention relates to a heat-insulating engine with swirl chamber having main combustion chambers and swirl chambers in an internal combustion engine.

2. Description of the Prior Art

As a prior art heat-insulating structure of a swirl chamber in an internal combustion engine, there is a system disclosed in the gazette of Jap. U.M. Laid-Open No. 59—21024 of which the present invention is concern. The swirl chamber has an eddy flow chamber in a cylinder head, an entire combustion chamber of the eddy flow combustion chamber is made of ceramic material and at the same time an air layer is formed at a substantial part of a fitted portion between the combustion chamber and the cylinder head made of ceramic material. An end facing a cylinder side at a fitted part between the combustion chamber and the cylinder head is gas-sealed with a seal member and an insertion part between the combustion chamber and its inserted unit is gas-sealed with the seal member.

A swirl chamber structure of an internal combustion engine, in particular, a swirl chamber structure defined by a swirl chamber ceramic material and having an improved thermal efficiency of the engine, improved heat-resistance characteristics and an improved durability of the swirl chamber is disclosed in the gazette of Jap. Pat. Laid-Open No. 61—123,714, for example. The swirl chamber structure of an internal combustion engine which is disclosed in the above-mentioned gazette is comprised of an upper ceramic body and a lower ceramic body fitted to said upper ceramic body, wherein a metallic annular ring is fitted to the outer circumferences of the upper ceramic body and the lower ceramic body, and the inner circumferential surface of the annular ring corresponding to the fitted surfaces of the upper ceramic body and the lower ceramic body is provided with an annular concave part.

In addition, the swirl chamber of an internal combustion engine of which an inner circumferential surface is formed by ceramic material is disclosed in the gazette of Jap. Pat. Laid-Open No. 60—212,614, for example. The swirl chamber of the internal combustion engine disclosed in the above-mentioned gazette is constructed such that a fitting member having communication holes between the chamber part of a substantial semi-spherical hollow body and the main chamber is made of ceramic material, respectively. The ceramic material at the chamber part composed of heat-insulating ceramics is casted with metal and at the same time the casted metal is simultaneously formed with a cylindrical projecting portion, and the ceramic fitting member composed of heat-resistant ceramics is shrinkage fitted to an inner side of the projection. In addition, a heat-insulating layer is partially arranged between the inside part of the cylindrical projection and the ceramics of the fitted part.

In general, in the case of combustion in a heat-insulating engine, the thermal energy from the combustion chamber may not be dispersed due to the heat-insulating structure of the engine, resulting in that the wall surface of the combustion chamber provides high temperature, a deteriorated efficiency and a deteriorated combustion speed. As regards the deteriorated gas intake efficiency, its cause consists in the fact that the intake air accepts heat from the wall surface of the combustion chamber and the air is hard to enter the combustion chamber. There is a problem as to how to construct the combustion chamber in such a way as the intake air may not accept heat from the wall surface of the combustion chamber or the wall surface of the intake port in order to prevent a reduction of a gas intake efficiency. The deterioration of the combustion speed is caused by an excessive increase in of temperature of intake air and a shortened ignition delay time of fuel. So, in order to prevent any deterioration of the combustion speed, there is a problem as to how to restrict the increase temperature of intake air and set the ignition delay time of fuel to a preferable period. In addition, there is a principle that a high temperature combustion of fuel may reduce an amount of discharged substance such as smoke; and NOx etc. by restricting the excess air ratio to 2 to 1.5, performing a high temperature combustion of mixture gas without making any fast leaning of mixture and decreasing its temperature rapidly as the piston descends.

SUMMARY OF THE INVENTION

It is a main object of the present invention to realize the above-mentioned principle and eliminate deterioration of the intake efficiency in a heat-insulating engine and deterioration of combustion speed and further to provide a heat-insulating engine with swirl chamber in which the main combustion chambers and the swirl chambers having a function to store heat and insulate heat are arranged, control valves capable of shielding a communicating condition between the main combustion chambers and the swirl chambers are provided, an operation of each of the control valves is controlled at the most preferable time for its opening or closing operation to prevent any deterioration of a gas intake efficiency and to prevent any deterioration of a combustion speed, a combustion time in a smoke generating temperature zone is shortened due to a thermal storing structure of the swirl chambers to perform a high temperature combustion and to restrict an occurrence of any smoke, a reduction of a gas intake efficiency for the main combustion chambers is prevented to avoid combustion at NOx generating temperature zones and an occurrence of NOx is restricted.

It is another object of the present invention to provide a structure of the swirl chamber for generating a superior swirl for air blown into the swirl chamber and further improving a heat accumulating structure and to provide a heat-insulating engine with swirl chamber in which control valves arranged in the communication holes between the main combustion chambers and the swirl chambers are prevented from being poorly slid, the control valves can be controlled with electromagnetic force and the opening or closing operation of the control valves can be carried out independent of the operating strokes of the engine.

It is still another object of the present invention to provide a heat-insulating engine with swirl chamber in which the swirl chambers are arranged in a cylinder head, the valve stems of the control valves are passed through the heat-insulating wall bodies forming the communication holes, the valve stems are arranged in spaced-apart relation from the swirl chambers, a thermal influence of the swirl chambers in respect to the valve stems of the control valves is restricted and the sliding characteristic of the control valves is improved.

It is still another object of the present invention to provide a heat-insulating engine with swirl chamber in which the swirl chambers provided with fuel injection nozzles and composed of heat-insulating wall bodies and the main combustion chambers provided with intake and exhaust valves are allowed to communicate via the communication holes, the control valves for use in opening or closing the communication holes are arranged, the control valves are set such that the communication holes are released near the end of a compression stroke of the engine and the communication holes are kept in a closed condition during an intake stroke. Accordingly, most of the combustion can be carried out at the swirl chambers under the opening or closing control of the control valves, a heat radiation is shielded by heat-insulating wall bodies of the swirl chambers to reduce an amount of heat radiation, a communicating state between the main combustion chambers and the swirl chambers is shielded by the control valves during an intake stroke, an influence of a high temperature part of the swirl chambers in respect to the intake air is shielded, a heat acceptance of intake air is restricted, a thermal expansion of the intake air is restricted to prevent a reduction of a gas intake efficiency, the control valves are released near the end of a compression stroke to provide a rapid flow of the intake air into the swirl chambers, and at this time the intake air receives heat from the wall surfaces of the swirl chambers and the communication holes and the combustion gas, its temperature is increased within a short period of time at the swirl chambers, and at the same time, mixing of the fuel injected from the fuel injection nozzles with the air is carried out rapidly to enable a fuel ratio to be made rich at once. Then, a combustion at a smoke generating temperature zone to be defined by a fuel ratio between fuel and air and a combustion temperature is cleared at once to accomplish a high temperature combustion without generating any smoke, and although the flame is blown from the swirl chambers to the main combustion chambers as swirl, it does not receive the thermal influence of the swirl chambers, so that the temperature of the main combustion chambers is well dependent upon intake air, resulting in that an air intake efficiency is not reduced, but superior, so that the fuel ratio is rapidly decreased and at the same time the combustion temperature is also decreased and combustion in a NOx generating temperature zone determined by a fuel ratio and a combustion temperature can be avoided. So, this type of heat-insulating engine with swirl chamber can prevent any smoke and NOx from being generated in the swirl chambers and the main combustion chambers.

It is yet still another object of the present invention to provide a heat-insulating engine with swirl chamber in which the control valves are released to open at a compression stroke in the following releasing period by a method wherein a releasing time of control valves arranged in the communication holes between the main combustion chambers and the swirl chambers is set to have a period ranging from a crank angle of 30° to 40° before the top dead center at the end of a compression stroke to a crank angle of 40° to 50° before the top dead center at the end of an exhaust stroke. Accordingly, a loss of compression corresponding to a volume of the swirl chamber from a starting of a compression stroke is not influenced, but the compressed air within the main combustion chambers rapidly flows into the swirl chambers simultaneous with the releasing of the control valves, the gas energy remaining in the swirl chambers can be utilized for combustion, the intake air is rapidly heated, its pressure is rapidly increased, and fuel is then injected to enable high temperature combustion to be carried out rapidly. In addition, the control valves are closed at the above-mentioned period of the exhaust stroke, so that an exhaust pressure has the lowest value, an amount of remaining gas within the swirl chambers can be made as small as possible. During an intake stroke, the control valves are kept closed, so that the intake air is not in contact with the high temperature part of the swirl chambers, resulting in that a gas intake efficiency hardly decreases thermal expansion of the intake air is restricted during the compression stroke and then work done is decreased.

It is still a further object of the present invention to provide a heat-insulating engine with swirl chamber in which control valves are arranged in communication holes between the main combustion chambers and the swirl chambers, the swirl chambers are constituted by heat-insulating wall bodies and arranged at a cylinder head located at a substantial central part of the cylinder, valve stems of the control valves are passed through the central portions of the swirl chambers. Accordingly, when the control valves are opened, intake air blown from a part around the valve heads of the control valves from the main combustion chambers into the swirl chambers may generate superior swirls around the valve stems of the control valves. In addition, since the control valves are exposed to a thermal flow, the outer surfaces of the control valves are covered by a heat-insulating layer to provide a heat-resistant characteristic, thereby inside portions of the swirl chambers are heated up to a high temperature and the intake air is prevented from being heated by the wall surfaces of the swirl chambers and combustion gas or in the main combustion chambers It is a still further object of the present invention to provide a heat-insulating engine with swirl chamber in which control valves are arranged in communication holes between the main combustion chambers and the swirl chambers, the swirl chambers are formed by cylindrical surface portions and both spherical surfaces of the cylindrical portions, and fuel injection nozzles arranged at the swirl chambers are formed into multi-injection holes, and the arrangement of the injection holes is made to have a large injection holes at their central portion and some small injection holes at an outer circumference. Accordingly, although the atomized gas is made substantially in a uniform state at the cylindrical surfaces, a flow speed at the central part of each of the swirl chambers is fast and the swirl speed is high, so that the flame is apt to be concentrated at the central part, resulting in a large amount of fuel being atomized at the central part and an excess air ratio can be made uniform and preferably the inner wall surface of each of the swirl chambers is formed into an irregular shape along a swirl stream line and the swirl can be made into a high speed flow to cause mixing of air and fuel to be superior, and thus heat from the wall surface of the swirl chambers can be sufficiently removed.

It is a still further object of the present invention to provide a heat-insulating engine with swirl chamber in which a swirl chamber blocks formed with swirl chambers, communication holes, guide holes for the control valves and valve seats are integrally formed by ceramic material and the main bodies of the swirl chambers are arranged at a cylinder head through the heat-insulating sheets. Accordingly, the swirl chambers can be constructed of very ideal heat accumulating structure and operated as described above with the control valves, whereby a heat influence from the swirl chambers can be shielded, so that a deterioration of intake efficiency is not generated. In addition, the control valves requiring a heat-resistant characteristic are made of the same ceramic material as that of the swirl chamber blocks to give a uniform distribution of temperature. Since the valve stems the control valves and the swirl chamber blocks have no difference in thermal expansion due to temperature when the engine is operated, it is possible to keep a clearance of an initial state between the valve stems and the guide holes formed in the swirl chamber blocks, and a poor sliding of the control valves under an influence of temperature can be prevented and a sliding of the valve stems of the control valves can be smoothly carried out with a better response.

It is another object of the present invention to provide a heat-insulating reciprocating engine with swirl chamber having intake and exhaust valves in which the swirl chambers constituted by a heat-insulating structure having fuel injection nozzles and the main combustion chambers are communicated by the communication holes, control valves for opening or closing the communication holes are arranged, whereby the control valves are constructed by connecting the non-magnetic ceramic valve heads and lower valve stems with the upper valve stems of magnetic material. The control valves are constructed to be light in weight; electromagnetic coils are arranged in respect to the upper valve stems; the electromagnetic force generated in the electromagnetic coils is controlled to control an opening or closing operation of the control valves; a position of each of the control valves is detected by a position sensor; and at the same time, the electromagnetic coils are controlled by a controller in response to an operating condition of the engine in terms of the number of revolutions of the engine and the load of the engine; and the opening or closing operation of the control valves is controlled. Accordingly, although the conventional type of cam mechanism operating the intake and exhaust valves may be opened or closed in response to an operating stroke of the engine, the control valves may control an electrical current supplied to the electromagnetic coils in response to the detected signals of the number of revolutions of the engine and the load of the engine independently of the operation stroke of the engine to enable a valve lift of each of the control valves and its opening or closing time to be controlled. For example, when the number of revolutions of the engine is low, a swirl is decreased, so that the valve lift of each of the control valves is decreased and a swirl speed in the swirl chambers is increased. In turn, when the engine is started to operate, a valve lift of each of the control valves is increased, thereby an effect of cooling of the swirl chambers under a swirl operation can be decreased.

DETAILED DESCRIPTION OF THE EMBODIMENTS

Referring now to the drawings, some preferred embodiments of the heat-insulating engine with swirl chamber constructed in accordance with the present invention will be described in detail.

At first, referring to FIG. 1, one preferred embodiment of the heat-insulating engine with swirl chamber constructed in accordance with the present invention will be described. This heat-insulating engine with swirl chamber is a reciprocating engine provided with a piston 11 and an intake and exhaust valve (an intake valve 7 is shown in the figure), the engine has a main combustion chamber 1 and a swirl chamber 2. Although the main combustion chamber 1 and the swirl chamber 2 are formed into a heat-insulating structure, only one example of a schematic structure of the heat-insulating structure is illustrated and this is not limited to one illustrated in the figure. In the case of this heat-insulating engine, a cylinder head 3 is fixed to a cylinder block 4 through a gasket 18. To a cylinder 5 of the cylinder block 4 is fitted a cylinder liner 6 composed of a heat-insulating wall body. At a lower surface of the cylinder head 3 is arranged a head lower surface 20 composed of a heat-insulating wall body composed of ceramic material and the like. The main combustion chamber 1 is comprised of a head lower surface 20, a cylinder liner 6 and a piston head upper surface 12 of a heat-insulating wall body. The head lower surface 20 of the cylinder head 3 acting as a forming wall surface of the main combustion chamber 1 is formed with a communication hole 9 by a heat-insulating wall body 22 composed of ceramic material and the like and further it is formed with a valve seat 14 (showing a valve seat at the intake valve 7 in the figure). The valve seat 14 is provided with the intake valve 7 and an exhaust valve. The communication hole 9 is opened at the head lower surface 20 of the cylinder head 3 and the communication hole 9 is communicated with the main combustion chamber 1 and the swirl chamber 2. The swirl chamber 2 is formed into a heat-insulating structure by a heat-insulating wall body 15 composed of ceramic material buried in the cylinder head 3. The swirl chamber 2 is provided with multi-injection holes 16 of a fuel injection nozzle 10.

The heat-insulating wall body constituting the cylinder liner 6 is made of ceramic material such as silicon nitride ($Si_3N_4$), silicon carbide (SiC) and composite materials. The heat-insulating wall body constituting the head lower surface 20 of the cylinder head 3 is made ceramic material such as of silicon nitride ($Si_3N_4$), silicon carbide (SiC) and composite materials. The head lower surface 20 is formed into a heat-insulating structure such that it adheres directly to the lower surface of the cylinder head 3 or is coated with chemical vapor deposition and the like, or it is connected through heat-insulating material 48 and a heat-insulating air layer 49 or coated with a chemical vapor deposition and the like. The swirl chamber 2 is formed into a structure having a heat accumulating function and a heat-insulating function. The heat-insulating wall body 15 forming the swirl chamber 2 and the heat-insulating wall body 22 forming the communication hole 9 are made of ceramic material such as silicon nitride ($Si_3N_4$), silicon carbide (SiC), and composite materials, and is directly buried into the cylinder head 3 or preferably it is formed by fixing it into the cylinder head 3 through heat-insulating material and a heat-insulating air layer and the like (not shown). In addition, the heat-insulating wall body forming the piston head upper surface 12 in the piston 11 is made such that a ceramic material such as silicon nitride ($Si_3N_4$), silicon carbide (SiC) and its composite materials and is directly connected or coated with a chemical vapor deposition and the like or through heat-insulating material (not shown) to form a heat-insulating structure. In addition, to the piston ring groove 23 of the piston 11 are fitted piston rings 21 made of ceramic material and the like. The intake valve 7 and the exhaust valve are made of ceramic material such as a silicon nitride ($Si_3N_4$) and silicon carbide (SiC). In general, in the case of a heat-insulating engine, radiation of a heat energy cannot be carried out due to the heat insulation during combustion, so that the wall surface of the combustion chamber and the interior part of the combustion chamber get into a high temperature state and then the deterioration of gas intake efficiency gas in an intake stroke and the deterioration of combustion speed result.

The heat-insulating engine with swirl chamber of the present invention is constructed as follows in order to eliminate the deterioration of intake efficiency in the heat-insulating engine and the deterioration of the combustion speed. As shown in FIG. 1, in the case of the heat-insulating engine with swirl chamber, a control valve 8 acting as a third valve is arranged in a communication hole 9 having a heat-insulating structure communicating the main combustion chamber 1 with the swirl chamber 2. In this case, the control valve 8 is comprised of a valve head and a valve stem, preferably it is made of ceramic material such as silicon nitride ($Si_3N_4$), silicon carbide (SiC) and its composite material and the like. The valve stem of the control valve 8 passes through a heat-insulating wall body 22 forming the communication hole 9 and the valve stem is spaced apart from the swirl chamber 2. A valve face of the control valve 8 is arranged at a valve seat 19 formed in the head lower surface 20 of the cylinder head 30. The control valve 8 opens or closes the communication hole 9 by moving the control valve 8 upwardly or downwardly through a cam mechanism or an electromagnetic force in order to setup either a communicating state or a shielded state between the main combustion chamber 1 and the swirl chamber 2. A piston head part of the piston 11 positioned at a location opposed to the control valve 8 is formed with a recessed part 17 acting as a valve relief part for the control valve 8 so as not to prohibit an opening or closing operation of the control valve 8.

Figure 1:
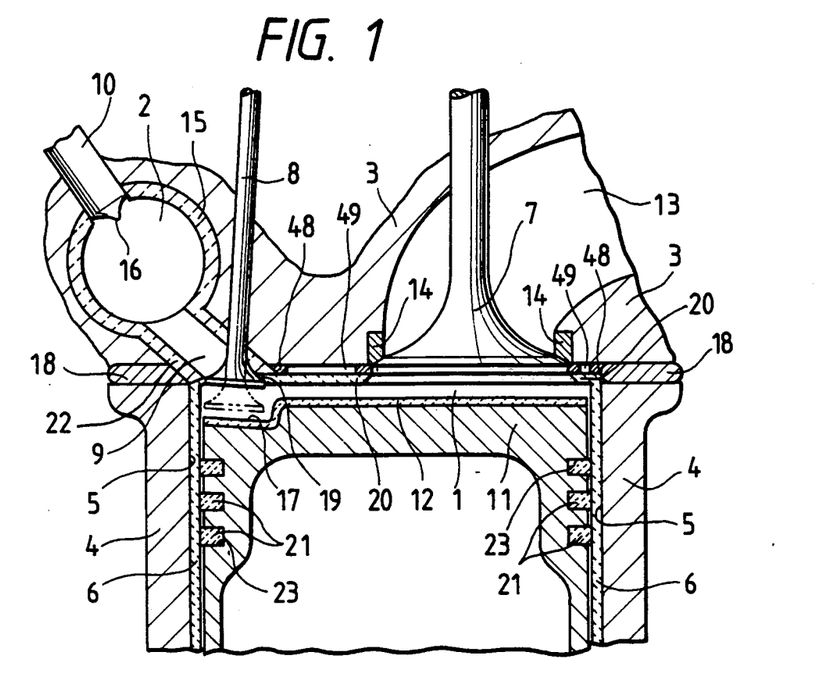
FIG. 1 is a sectional view for showing one preferred embodiment of a heat-insulating engine with swirl chamber constructed in accordance with the present invention.
Figure 7:
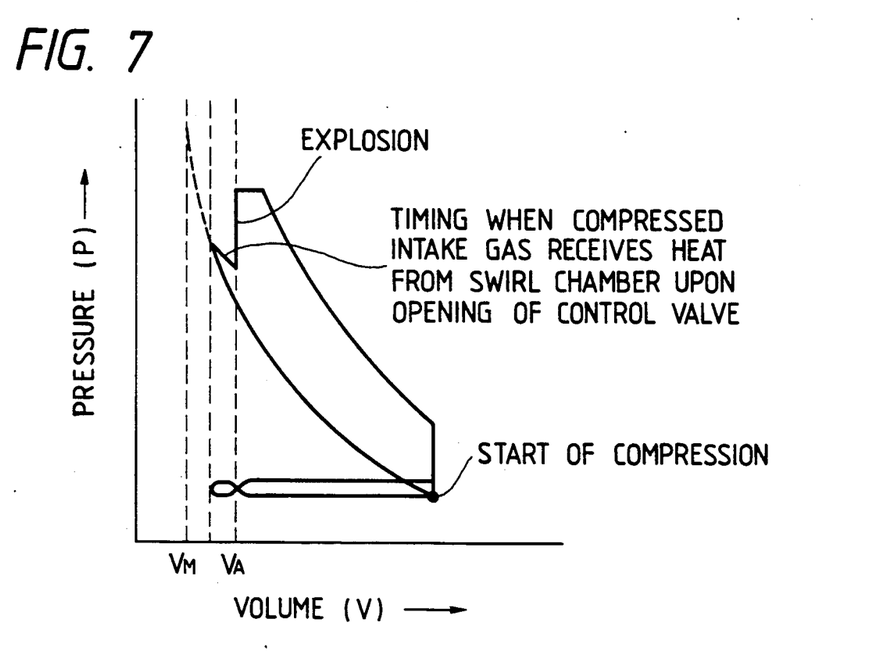
FIG. 7 is a P-V curve of the heat-insulating engine with swirl chamber constructed in accordance with the present invention.
Figure 8:
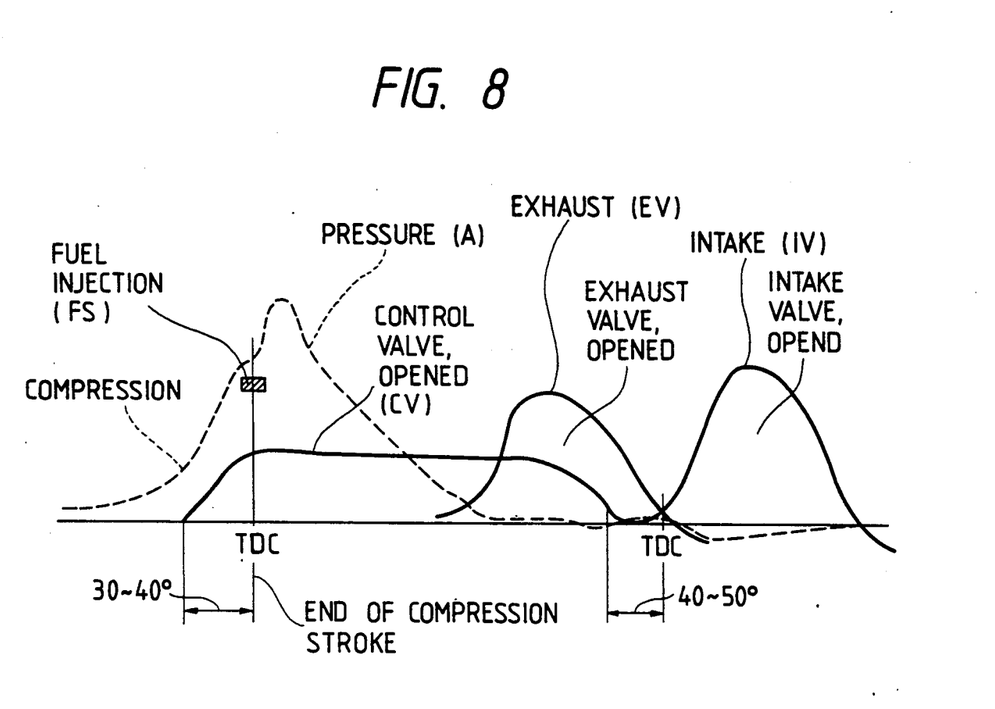
FIG. 8 is a diagram for showing an operating stage of the heat-insulating engine with swirl chamber constructed in accordance with the present invention.

Referring to FIGS. 1, 7 and 8, a control over an opening or closing of the control valve 8 will be described. FIG. 7 is a P-V diagram for a heat-insulating engine with swirl chamber and FIG. 8 is a diagram for showing the relation between an operating stroke of the heat-insulating engine with swirl chamber and the opening or closing operation of the control valve 8. A control over an opening or closing of the control valve 8 mainly releases the communication hole 9 near the end of a compression stroke of the engine to cause the main combustion chamber 1 to communicate with the swirl chamber 2 and closes the communication hole 9 during an intake stroke to maintain the main combustion chamber 1 and the swirl chamber 2 in their shielded conditions. That is, a releasing time for the control valve 8 is set to have a period ranging from a crank angle of 30° to 40° before the top dead center at the end of a compression stroke to a crank angle of 40° to 50° before the top dead center at the end of an exhaust stroke. Further, most of the mixture is ignited in the swirl chamber 2, the heat radiation is shielded by the heat insulation wall bodies 15 and 22 forming the swirl chamber 2, and an amount of heat radiation is decreased and the heat is accumulated in the swirl chamber 2. Thus, since the control valve 8 closes the communication hole 9 during an intake stroke, the combustion gas remaining in the swirl chamber 2 does not flow out to the main combustion chamber 1 during an intake stroke, no heat energy is applied to the intake air, and heating of the intake air is reduced, so that no expansion of the intake air is found, and this results in the intake air being allowed to smoothly flow into the main combustion chamber 1 so an efficiency operation is not lowered. The control valve 8 is released near an end of the compression stroke to cause the communication hole 9 to communicate. When the compression stroke is started and the control valve 8 is released to cause the swirl chamber 2 to communicate with it, the pressure loss corresponding to an amount of volume of the swirl chamber 2 is generated during the compression stroke, and the results in that the above-mentioned preferable releasing time. Thus, the intake air compressed in the main combustion chamber 1 rapidly flows into the swirl chamber 2 under the releasing of the control valve 8, heat is applied from the wall surfaces of the swirl chamber 2 and the communication hole 9, and the remaining combustion gas, and the intake air is heated, expanded and its pressure is increased.

Referring to the P-V diagram shown in FIG. 7, a volume V is increased by an amount corresponding to two swirl chambers by releasing the control valve 8 and a pressure P is decreased. However, the heat energy stored in the swirl chamber 2 is at its wall surface and the remaining gas is utilized and the pressure is increased by an amount corresponding to the calorie. In this P-V diagram $V_A$ and $V_M$ are the volumes formed in the main combustion chamber 1 at the top dead center, for example, $V_A=40$ cc and $V_M=40$ cc, respectively. After this condition, fuel is injected from the fuel injection nozzle 10 into the swirl chamber 2, and is ignited at a high temperature and the fuel is moved to its exhaust stroke under an ideal process. Since the control valve 8 is closed at a period of a crank angle of 40° to 50° before the top dead center at the end of the exhaust stroke, the lowest exhaust pressure is found at the closing period and an amount of combustion gas remaining in the swirl chamber 2 can be reduced as much as possible and during the intake stroke, the intake air does not come in contact with the high temperature part of the swirl chamber 2. Thus, since the intake efficiency hardly decreases and the thermal expansion of the intake air during an intake stroke is restricted, the work done is decreased.

The operating stroke mentioned above in the heat-insulating engine with swirl chamber constructed in accordance with the present invention enables the fuel ratio of fuel injected from the fuel injection nozzle 10 installed in the swirl chamber 2 to be high rapidly. Further heat is accumulated in the wall surface of the swirl chamber 2 and the remaining gas under a closed state of the control valve 8, is such that the intake air flowing into the swirl chamber 2 at the end of the compression stroke shows an increased temperature within a short period of time. Furthermore, a mixing of the injected fuel with air is rapidly carried out, and the combustion in a smoke generating temperature zone is determined by a fuel ratio between the fuel and air and a combustion speed is rapidly cleared to perform a high temperature combustion then the flame is blown as a swirl from the swirl chamber 2 to the main combustion chamber 1. The flame is blown from the swirl chamber 2 to the main combustion chamber 1, resulting in a sufficient amount of intake air being present in the main combustion chamber 1 so that the fuel ratio is rapidly decreased. In addition, the control valve 8 closes the swirl chamber 2 during an intake stroke, so that the temperature of the main combustion chamber 1 has good dependency on the intake air and the efficiency of intake air to be fed is superior, so that the fuel ratio is decreased within a short period of time and the combustion temperature is decreased, so that combustion in the NOx generating temperature zone determined by the fuel ratio and the combustion temperature can be avoided. Accordingly, in the case of the heat-insulating engine with swirl chamber, of the present invention, combustion free from the occurrence of smoke and the occurrence of NOx can be carried out in the swirl chamber 2 and the main combustion chamber 1 and the smoke and NOx can be decreased.

Figure 2:
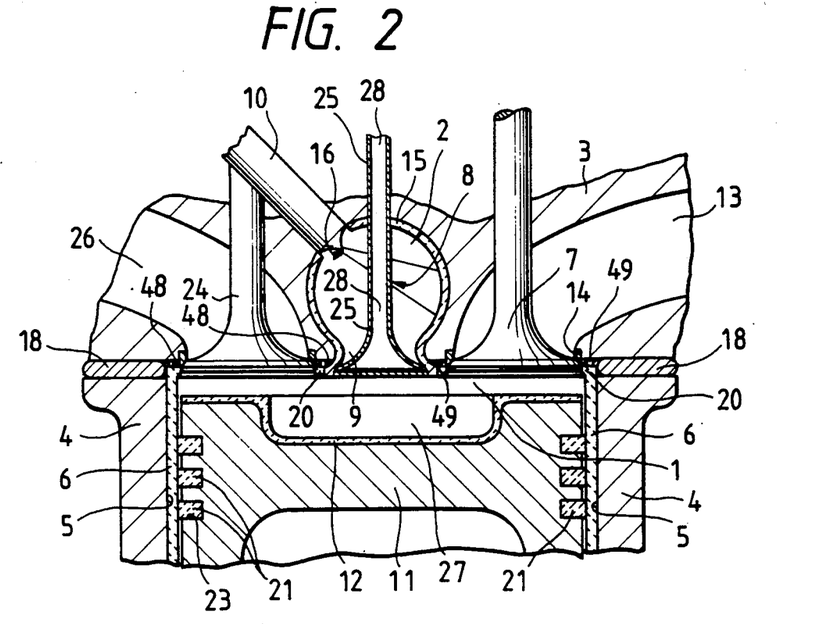
FIG. 2 is a sectional view showing another embodiment of a heat-insulating engine with swirl chamber according to the present invention.

Referring now to FIG. 2, there is described another embodiment of the heat-insulating engine with swirl chamber constructed in accordance with the present invention. This heat-insulating engine with swirl chamber has the same structure as that of the above-mentioned preferred embodiment except that the shape and the installing position of the swirl chamber, the installing position of the control valve, the shape of the piston head, and further, the control valve, has the same operating stroke as that of the above-mentioned preferred embodiment, and further has the same function as that of said embodiment, and the same parts or parts having the same function are denoted by the same reference numerals and their duplicating explanation is omitted.

In FIG. 2, the heat-insulating engine with swirl chamber is made such that the swirl chamber is arranged at the cylinder head 3 opposed to a substantial central part of the cylinder 5, i.e. the cylinder liner 6, and the control valve 8 is arranged at a central part of the swirl chamber 2, and the intake valve 7 and the exhaust valve 24 are arranged in the intake port 13 and the exhaust port 26 formed at both sides of the swirl chamber 2. The control valve 8 is arranged in such a way that it may be opposed to the combustion chamber 27 at the piston having a recessed shape formed at an upper surface central part of the piston head of the piston 11, thereby being constructed so as not to hinder the opening or closing operation of the control valve 8. This control valve 8 is set in such a way that it passes through the heat-insulating wall body 15 of the swirl chamber 2 and it reciprocates upwardly or downwardly through a cam mechanism or under an electromagnetic force. The control valve 8 is comprised of a valve head and a valve stem and is formed with a heat-insulating layer 25 covered with ceramic material such as zirconium at a valve main body 28 and an outer surface of the valve main body 28 made of titanium alloy and the like through a sputtering operation. Since the heat-insulating engine with swirl chamber is constructed as described above, air from the main combustion chamber 1 flow around the valve head when the control valve 8 is released and the air is blown in such a way that it forms a superior swirl around the valve stem in the swirl chamber 2. Although the control valve 8 is exposed to the heat flow, a heat-resistance characteristic can be provided by an outer surface heat-insulating layer 25 of the main body of the control valve 28, and a part within the swirl chamber 2 is heated up to a hot temperature, and further heat flow to the main combustion chamber 1 is prohibited, so that the intake air is prohibited from being heated in the main combustion chamber 1. Since the opening or closing operation of the control valve 8 and its action are similar to that of the above-mentioned preferred embodiment, their description is omitted.

Figure 3:
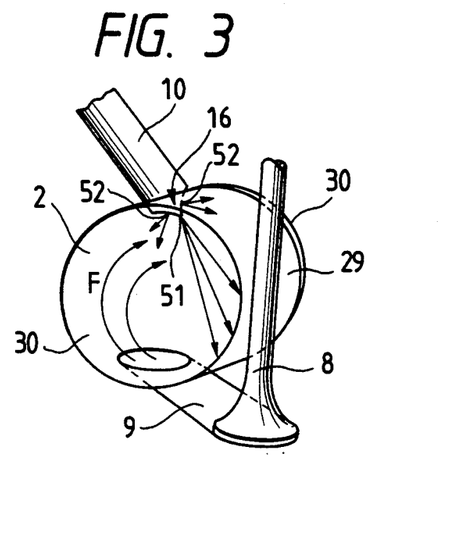
FIG. 3 is a perspective view showing one example of a swirl chamber in a still further embodiment of the heat-insulating engine with swirl chamber constructed in accordance with the present invention.

Referring now to FIG. 3, a still further embodiment of the heat-insulating engine with swirl chamber constructed in accordance with the present invention. As compared with the preferred embodiment shown in FIG. 1, the heat-insulating engine with swirl chamber has a feature in the shape of the swirl chamber and only the swirl chamber will be illustrated in order to illustrate the constitution of the swirl chamber. In addition, the control valve has the same operating stroke as that of the above-mentioned preferred embodiment and has the same function as that of said embodiment, so that the same reference numerals are applied and its duplicated description will be omitted.

FIG. 3 is a perspective view for showing only the swirl chamber 2 in the heat-insulating engine with swirl chamber. In FIG. 3, in the case of the heat-insulating engine with swirl chamber, the shape of the swirl chamber 2 is made by forming the inner surface where the communication hole 9 is opened by a cylindrical surface 29 and by forming both ends of the cylindrical surface 29 with a spherical surface 30. The communication hole 9 is formed in slanted relation to the cylindrical inner surface of the swirl chamber 2 so as to cause the air blown into the swirl chamber 2 to generate swirl. The fuel injection nozzle 10 arranged at the swirl chamber 2 is formed into an injection port 16 having a multiple injection holes, a large injecting hole 51 is placed at the center and small injection ports 52 are formed at an outer circumference so as to make atomized gas uniform in the swirl chamber 2. That is, flowing air from the main combustion chamber 1 has a high flow speed at a central part of the swirl chamber 2, wherein the swirl speed is high and the flame is apt to easily be concentrated at a central part. The injecting port 16 of the fuel injection nozzle 10 is formed at a central part as described above, and a large amount of fuel is atomized at the central part to enable an excess air ratio to be uniform. The shape of the inner wall surface of the swirl chamber 2 can be made into an irregular shape (not shown) along a swirl stream line F in order to improve mixing of air and fuel with the swirl acting as a high speed flow and to get a sufficient removal of heat from the heat-insulating wall. Since the opening or closing operation of the control valve 8 and its action are the same as that shown in the preferred embodiment of FIG. 1, their description will be omitted.

In addition, referring now to FIGS. 4 and 5, there will now be described another embodiment of the heat-insulating engine with swirl chamber of the present invention. As compared with the preferred embodiment shown in FIG. 1, the heat-insulating engine with swirl chamber has a feature in an arrangement of a shape of the swirl chamber and an arrangement of a control valve, and has the same structure except for those different points and further the control valve has the same operating stroke as that of the preferred embodiment shown in FIG. 1 and has the same function as that of the preferred embodiment shown in FIG. 1, so that the same reference numerals are applied to the same parts or parts having the same function and its duplicated description will be omitted.

Figure 4:
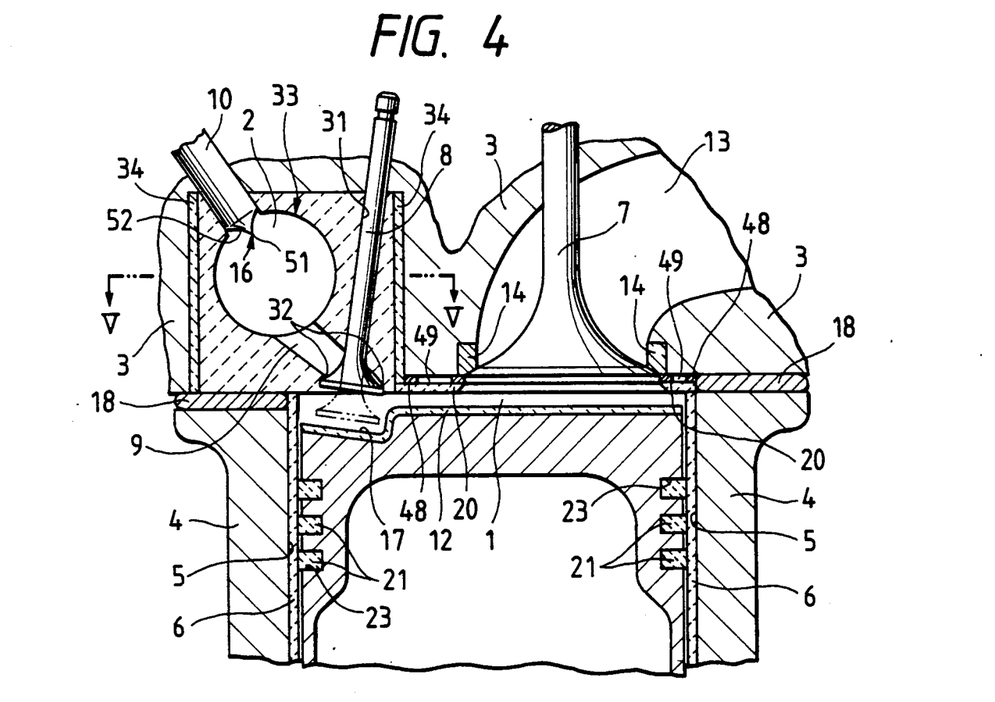
FIG. 4 is a sectional view showing another embodiment of the heat-insulating engine with swirl chamber constructed in accordance with the present invention.
Figure 5:
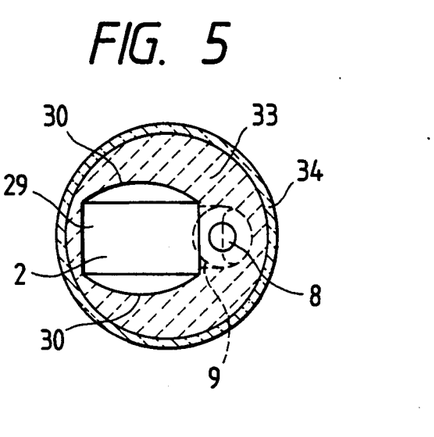
FIG. 5 is a sectional view showing a main body of a swirl chamber taken along a line V—V of FIG. 4.

FIG. 4 is a sectional view showing a heat-insulating engine with swirl chamber constructed in accordance with the present invention and FIG. 5 is a sectional view showing a swirl chamber taken along a line V—V of FIG. 4. In this heat-insulating engine with swirl chamber, the swirl chamber block 33 formed with the swirl chamber 2, communication hole 9, guide hole 31 for the control valve 8 and the valve seat 32 are integrally formed into a structure of ceramic material such as silicon nitride (Si₃N₄), silicon carbide (SiC) and its composite materials. This swirl chamber block 33 is arranged at the cylinder head 3 through the heat-insulating seat 34 in order to make a more complete heat-insulating structure. The swirl chamber 2 and the control valve 8 are constructed as described above, therefore the swirl chamber 2 can be made of a heat accumulating structure, and as described above, the deterioration of gas intake efficiency is not encountered. In addition, the control valve 8 requiring a heat-resistant characteristic is comprised of a valve head and a valve stem and is made of the same ceramic material as the ceramic material constituting the swirl chamber block 33. Accordingly, it is possible to make uniform distributions of temperature in the control valve 8 and the swirl chamber block 33, to keep a clearance of the initial state between the guide hole 31 formed in the swirl chamber block 33 and the valve stem of the control valve 8. Poor sliding of the control valve 8 caused by a difference in temperature is not generated during the operation of the engine and further a sliding movement of the control valve 8 can be positively carried out with a better response. Although the shape of the swirl chamber 2 is not limited to a cylindrical shape shown in FIG. 3, in this figure, an inner surface where the communication hole 9 is opened is formed by the cylindrical surface 29 and both ends of the cylindrical surface 29 are formed by a spherical surface 30 of a part of a spherical surface. The communication hole 9 is formed in a slanted state in respect to the cylindrical surface 29 at an inner surface of the swirl chamber 2 so as to cause the air sucked into the swirl chamber 2 to form a swirl.

The swirl chamber block 33 is made by a method wherein ceramic material forming the swirl chamber block 33 is filled and baked while material such as plastic and the like is arranged at the portions where the swirl chamber 32, communication hole 9, valve seat 32 and guide hole 31 are formed. The plastic material is lost through the baking operation due to lost furn and then the swirl chamber block 33 composed of ceramic material is formed.

Figure 6:
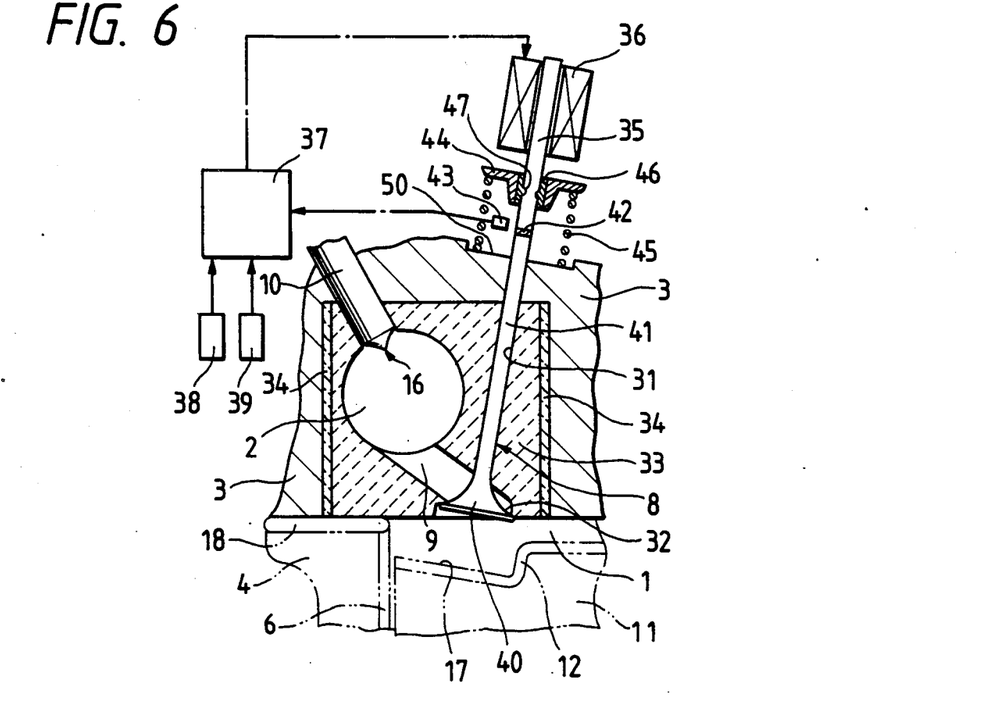
FIG. 6 is an illustrative view showing one example of an operating means in a control valve in another embodiment of the heat-insulating engine with swirl chamber constructed in accordance with the present invention.

Referring to FIG. 6, a yet still further embodiment of the heat-insulating engine with swirl chamber constructed in accordance with the present invention will be described. As compared with the embodiment shown in FIG. 4, the heat-insulating engine with swirl chamber has the same structure except for the structure of the control valve and an example of the operating means in particular. Accordingly, the structure of the control valve, the operating means are illustrated in order to describe them and other constitutions are the same as that of the embodiment shown in FIG. 4, so that its illustration is omitted. Further, since the control valve has the same operating stroke as that of the preferred embodiment above and has the same function as that of the preferred embodiment, the same reference numerals are applied to the same parts or the parts having the same function and its duplicated description is omitted.

FIG. 6 is a schematic illustration showing a still further embodiment of the heat-insulating engine with swirl chamber constructed in accordance with the present invention. In this heat-insulating engine with swirl chamber, the control valve 8 arranged in the valve guide i.e. the guide hole 31 formed in the swirl chamber block 33 is operated by electromagnetic force. This control valve 8 is constructed such that the valve head 40 and the lower valve stem 41 are made of non-magnetic ceramic material such as silicon nitride, silicon carbide and its composite materials and the upper valve stem 35 is made of magnetic material such as silicon steel. The upper end surface of the lower valve stem 41 and the lower end surface of the upper valve stem 35 are connected and abutted to each other at the connecting part 42. The connection between the lower valve stem 41 and the upper valve stem 35 may be direct or indirect through a heat-insulating material. A mass of the control valve 8 can be made small by constituting the control valve 8 as described above. Accordingly, the upper valve stem 35 is made of magnetic material and the upper valve stem 35 and the valve head 40 are made of ceramic material, so that a load of the valve itself is decreased and it becomes possible to operate the control valve 8 with the electromagnetic force. A valve spring cotter 46 fitted into a cotter groove 47 formed in the upper valve stem 35 is fitted to the spring seat 44 and at the same time a valve spring 45 is arranged between the spring seat 44 and the spring seat 50 at the upper surface of the cylinder head 3, thereby the control valve 8 may be set to the valve seat 32 of the swirl chamber block 33. In other words, the valve spring 45 may act as a return spring for use in closing the communication hole 9 with the control valve 8. The release operating means for the control valve 8 is constructed such that a magnetizing coil i.e. an electromagnetic coil 36 is arranged at an outer circumference of the upper valve stem 35 made of magnetic material. A control of an electric current to the electromagnetic coil 36 is carried out in such a way that it may be controlled by the controller 37. To the controller 37 are inputted a rotation sensing signal from a rotation sensor 38 for use in detecting the number of revolutions of the engine, a torque sensing signal from a torque sensor 39 for use in detecting a load of the engine and a position sensing signal from a position sensor 43 for detecting a valve lift position of the control valve 8.

The controller 37 may supply an electrical current to the electromagnetic coil 36 in response to each of these sensing signals and control an opening or closing operation of the control valve 8.

Since the operation control means for the control valve 8 in the heat-insulating engine with swirl chamber shown in FIG. 6 is constructed as described above, a releasing period for the control valve 8 for the controller 37 is set in advance ranging from a crank angle of 30° to 40° before the top dead center at the end of a compression stroke to a crank angle of 40° to 50° before the top dead center at the end of an exhaust stroke, thereby the control valve 8 may perform the same controlling operation as that found in the heat-insulating engine with the swirl chamber shown in FIG. 1 so as to prevent reduction in of intake gas efficiency of intake gas and at the same time it may decrease an occurrence of NOx and smoke. Electrical current flowing in the electromagnetic coil 36 can be controlled in response to the number of revolutions of the engine and the load of the engine while sensing a position of the control valve 8 and further the opening or closing operation of the control valve, i.e. the valve lifting operation can be controlled. For example, since the swirl is small during a low number of revolutions of the engine, it is possible to increase the swirl speed by decreasing the valve lifting distance of the control valve 8. At the time of starting the engine, it is possible to reduce a cooling effect by a swirl by increasing the valve lifting distance of the control valve 8.

What is claimed is:

1. A heat-insulating engine with swirl chamber comprising:
   a cylinder block having cylinders;
   cylinder liners fitted to said cylinders;
   a cylinder head provided with a head lower surface fixed to said cylinder block and formed with intake and exhaust ports;
   intake and exhaust valves arranged in said intake and exhaust ports;
   pistons provided with piston heads reciprocating within said cylinder liners;
   main combustion chambers constituted by said cylinder liners, said heat lower surface of said cylinder head and said piston heads;
   swirl chambers formed in said cylinder head and constituted by heat-insulating wall bodies;
   fuel injection nozzles having injection ports opened into said swirl chambers;
   communication holes formed in said cylinder head and made by said heat-insulating wall bodies communicating said swirl chambers with said main combustion chambers; and
   control valves for use in opening or closing said communication holes;
   wherein said heat-insulating engine with swirl chamber further comprises:
   control valves having ceramic valve heads and ceramic valve stems which are integral with said valve heads, and said valve stems of said control valves are passed through the heat-insulating wall bodies forming said communication holes and said valve stems of said control valves are spaced apart from swirl chambers;
   wherein said communication holes are closed by operating said control valves in order to shut off communication between said swirl chambers and said main combustion chambers near the end of a low-exhaust-gas-pressure compression stroke during an exhaust stroke where residual gas in said swirl chambers is reduced, said communication holes are closed by said control valves during an intake stroke to maintain shut-off of the communication between said swirl chambers and said main combustion chambers in order to suppress heating of intake air by heat from said swirl chambers that have been heated, and said communication holes are opened by operating said control valves near the end of the compression stroke so that the intake air is quickly fed into said swirl chambers from said main combustion chambers via said communication holes, is expanded by the heat from the wall surfaces of said swirl chambers, and is combusted at a high temperature after being mixed with fuel injected from said fuel injection nozzles, so that the combustion cycle can be shifted to an exhaust step.

2. A heat-insulating engine with swirl chamber according to claim 1 in which the heat-insulating wall bodies forming said swirl chambers and said communication holes are made of ceramic material.

3. A heat-insulating engine with swirl chamber according to claim 1 in which said cylinder liners, the lower surface of said cylinder head and said piston heads said pistons are comprised of heat-insulating wall bodies of ceramic material.

4. A heat-insulating engine with swirl chamber according to claim 1 in which each of said control valves is comprised of a ceramic valve head, a ceramic lower valve stem which is integral with said valve head and an upper valve stem made of magnetic material connected to said lower valve stem.

5. A heat-insulating engine with swirl chamber according to claim 1 in which the piston heads of said pistons are formed with recessed parts acting as a relief part for said control valves.

6. A heat-insulating engine with swirl chamber according to claim 1, wherein a releasing time when said control valves release said communication holes is set at a crank angle of 30° to 40° before the top dead center at the end of a compression stroke, and a closing time when said control valves close said communication holes is set at a crank angle of 40° to 50°before the top dead center at the end of an exhaust stroke where the exhaust pressure is lowest.

7. A heat-insulating engine with swirl chamber comprising:
   a cylinder block having cylinders;
   cylinder liners fitted to said cylinders;
   a cylinder head provided with a head lower surface fixed to said cylinder block and formed with intake and exhaust ports;
   intake and exhaust valves arranged in said intake and exhaust ports;
   pistons provided with piston head reciprocating within said cylinder liners;
   main combustion chambers constituted by said cylinder liners, said head lower surface of said cylinder head and said piston heads;
   swirl chambers formed in said cylinder head corresponding to center parts of said cylinder and constituted by heat-insulating wall bodies;
   fuel injection nozzles having injection ports opened into said swirl chambers;
   communication holes formed in said cylinder head and made by said heat-insulating wall bodies communicating said swirl chambers with said main combustion chambers; and control valves for use in opening or closing said communication holes;

wherein said heat-insulating engine with swirl chamber further comprises:

center parts of said piston heads of said pistons formed with concave parts of said main combustion chambers, said concave parts and said swirl chambers being opposed to each other;

wherein said communication holes are closed by operating said control valves in order to shut off the communication between said swirl chambers and said main combustion chambers near the end of a low-exhaust-gas-pressure compression stroke during an exhaust stroke where residual gas in said swirl chambers is reduced and said combustion holes are closed by said control valves during an intake stroke to maintain shut off of the communication between said swirl chambers and said main combustion chambers in order to suppress heating of the intake airy by the heat from said swirl chambers that have been heated, and said communication holes are opened by operating said control valves near the end of the compression stroke so that the intake air is quickly fed into said swirl chambers from said main combustion chambers via said communication holes is expanded by heat from wall surfaces of said swirl chambers, and is combusted at a high temperature after mixing with fuel injected from said fuel injection nozzles, and the combustion cycle is shifted to an exhaust step.

8. A heat-insulating engine with swirl chamber according to claim 7 in which the heat-insulating wall bodies forming said swirl chambers and said communication holes are made of ceramic material.

9. A heat-insulating engine with swirl chamber according to claim 7 in which said cylinder liners, said head lower surface of said cylinder head and said piston heads of said pistons are composed of heat-insulating wall bodies made of ceramic material.

10. A heat-insulating engine with swirl chamber according to claim 7 in which outer surfaces of said control valves are covered with ceramic material to form heat-insulating structures.

11. A heat-insulating engine with swirl chamber according to claim 7 in which a releasing time when said control valves release said communication holes is set to have a period from a crank angle of 30° to 40° before the top dead center at the end of a compression stroke to a crank angle of 40° to 50° before the top dead center at the end of an exhaust stroke.

12. A heat-insulating engine with swirl chamber comprising:

a cylinder block having cylinders;

cylinder liners fitted to said cylinders;

a cylinder head fixed to said cylinder block and provided with a heat lower surface formed with intake and exhaust ports;

intake and exhaust valves arranged in said intake and exhaust ports;

pistons provided with piston heads reciprocating within said cylinder liners;

main combustion chambers constituted by said cylinder liners, said head lower surface of said cylinder head and said piston heads;

swirl chambers formed in said cylinder head and constituted by heat-insulating wall bodies;

communication holes formed in said cylinder head and constituted by said heat-insulating wall bodies for generating swirls for communicating said swirl chambers with said main combustion chambers;

fuel injection nozzles having injection ports opened into said swirl chambers and formed with multi-injection holes;

a shape of each of said swirl chambers being formed such that a surface having said communication hole and said injection ports of said fuel injection nozzle is formed as a cylindrical surface and both sides of said cylindrical surface are formed into a spherical surface; and control valves for use in opening or closing said communication holes, said control valves releasing said communication holes near the end of the compression stroke and said communication holes being kept closed by said control valves during an intake stroke.

13. A heat-insulating engine with swirl chamber according to claim 12 in which heat-insulating wall bodies forming said swirl chambers and said communication holes are made of ceramic material.

14. A heat-insulating engine with swirl chamber according to claim 12 in which said cylinder liners, said head lower surface part of said cylinder head and said piston heads of said pistons are composed of heat-insulating wall bodies made of ceramic material.

15. A heat-insulating engine with swirl chamber according to claim 12 in which a releasing time when said control valves release said communication holes is set to have a period from a crank angle of 30° to 40° before the top dead center at the end of a compression stroke to a crank angle of 40° to 50° before the top dead center at the end of an exhaust stroke.

16. A heat-insulating engine with swirl chamber according to claim 12 in which each of said injection ports of said fuel injection nozzles positioned at a longitudinal central part of said cylindrical surface and each of said injection ports formed at said fuel injection nozzles is formed to have a large injection hole at a central part and small injection holes at an outer peripheral part.

17. A heat-insulating engine with swirl chamber comprising:

a cylinder block having cylinders;

cylinder liners fitted to said cylinders;

a cylinder head fixed to said cylinder block and provided with a head lower surface formed with intake and exhaust ports;

intake and exhaust valves arranged in said intake and exhaust ports;

pistons provided with piston heads reciprocating within said cylinder liners;

main combustion chambers constituted by said cylinder liners, said head lower surface of said cylinder head and said piston heads;

swirl chambers formed in said cylinder head and constituted by heat-insulating wall bodies;

fuel injection nozzles having injection ports opened into said swirl chambers;

communication holes formed in said cylinder head and communicating said swirl chambers with said main combustion chambers;

control valves for use in opening or closing said communication holes, said control valves being comprised of ceramic valve heads, ceramic lower valve stems integral with said valve heads and upper valve stems made of magnetic material connected to said lower valve stems; and electromagnetic coils arranged in respect to said upper valve stems, said control valves being opened or closed by electromagnetic force generated under feeding of electric current to said electromagnetic coils, said control valves releasing said communication holes near the end of a compression stroke and said communication holes being kept closed by said control valves during an intake stroke.

18. A heat-insulating engine with swirl chamber according to claim 17 in which heat-insulating wall bodies forming said swirl chambers and said communication holes are constituted by ceramic material 19. A heat-insulating engine with swirl chamber according to claim 17 in which said cylinder liners, said head lower surface of said cylinder head and said piston heads of said pistons are composed of heat-insulating wall bodies made of ceramic material.

20. A heat-insulating engine with swirl chamber according to claim 17 in which a releasing time when said control valves release said communication holes is set to have a period ranging from a crank angle of 30° to 40° before the top head center at the end of a compression stroke to a crank angle of 40° to 50° before the top dead center at the end of an exhaust stroke.

21. A heat-insulating engine with swirl chamber comprising:

a cylinder block having cylinders;

cylinder liners fitted to said cylinders;

a cylinder head fixed to said cylinder block and provided with a head lower surface formed with intake and exhaust ports;

intake and exhaust valves arranged in said intake and exhaust ports;

pistons provided with piston heads reciprocating within said cylinder liners;

main combustion chambers constituted by said cylinder liners, said head lower surface of said cylinder head and said piston heads;

swirl chambers formed in said cylinder head and constituted by heat-insulating wall bodies;

fuel injection nozzles having injection ports opened into said swirl chambers;

communication holes formed in said cylinder head and constituted by said heat-insulating wall bodies for communicating said swirl chambers with said main combustion chambers;

control valves for use in opening or closing said communication holes, said control valves being constituted by ceramic valve heads, ceramic lower valve stems integral with said valve heads and upper valve stems made of magnetic material connected to said lower valve stems;

electromagnetic coils arranged in respect to said upper valve stems;

a sensor for sensing a position of each of said control valves;

a sensor for sensing an operating condition of the engine;

a controller for use in opening or closing said control valves by electromagnetic force generated under supplying of electrical current to said electromagnetic coils in order to control the opening or closing operation of said control valves, releasing said communication holes near the end of a compression stroke and keeping said communication holes closed by said control valves.

22. A heat-insulating engine with swirl chamber according to claim 21 in which the heat-insulating wall bodies forming said swirl chambers and said communication holes are made of ceramic material.

23. A heat-insulating engine with swirl chamber according to claim 21 in which said cylinder liners, said head lower surface of said cylinder head and said piston heads of said pistons are constituted by heat-insulating wall bodies made of ceramic material.

24. A heat-insulating engine with swirl chamber according to claim 21 in which a releasing time when aid control valves release said communication holes is set to have a period ranging from a crank angle of 30° to 40° before the top dead center at the end of a compression stroke to a crank angle of 40° to 50° before the top dead center at the end of an exhaust stroke.

25. A heat-insulating engine with swirl chamber according to claim 21 in which said sensor for sensing an operating condition of said engine is a load sensor for sensing a load of the engine.

26. A heat-insulating engine with swirl chamber according to claim 21 in which said sensor for sensing an operating condition of said engine is a rotation sensor for sensing the number of revolutions of the engine

* * * * *